Jan. 19, 1943.  G. E. MEREDITH ET AL  2,308,705
TIMING MECHANISM
Filed Sept. 7, 1940 2 Sheets-Sheet 2
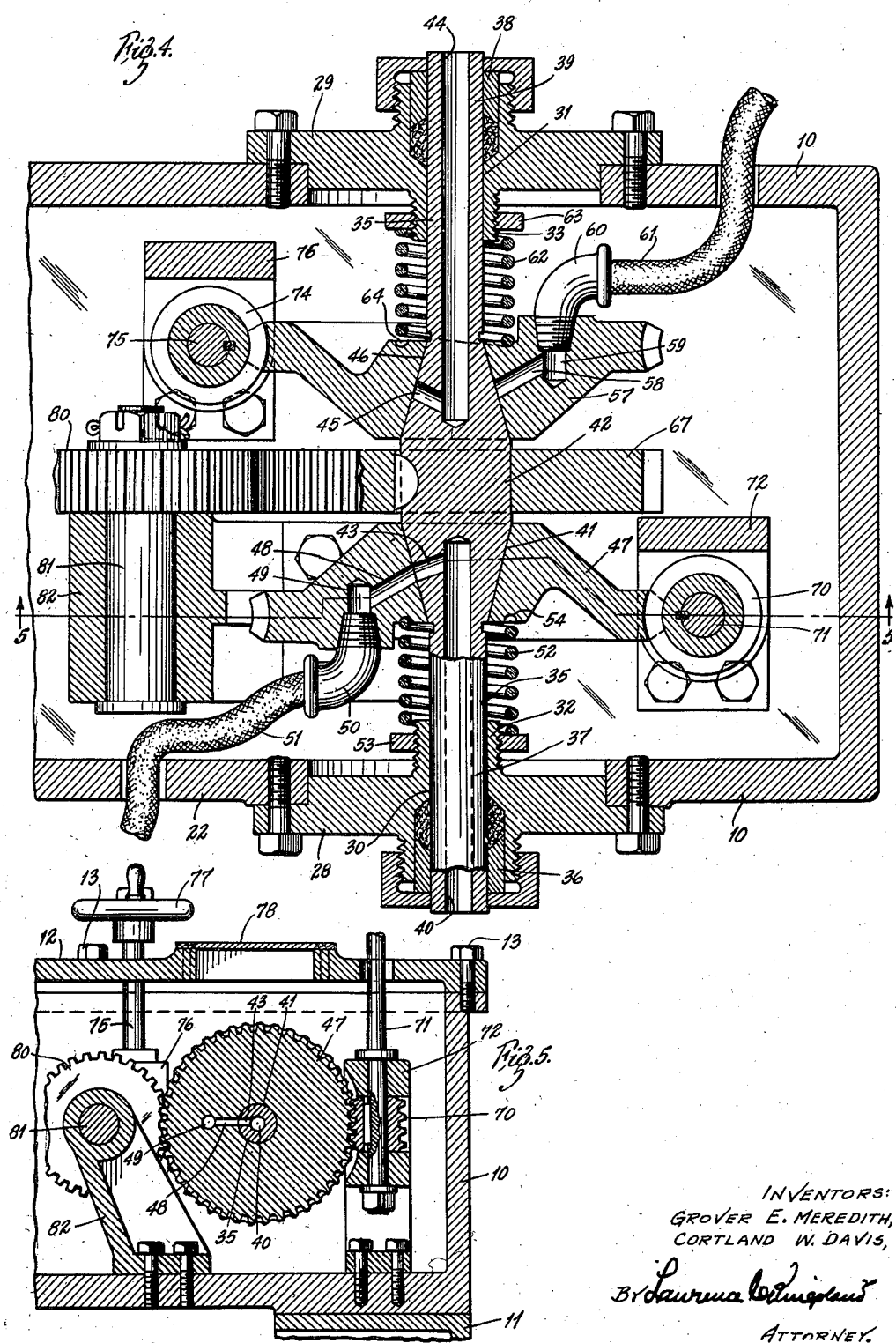
INVENTORS:
GROVER E. MEREDITH,
CORTLAND W. DAVIS,
BY Laurence Clingland
ATTORNEY.

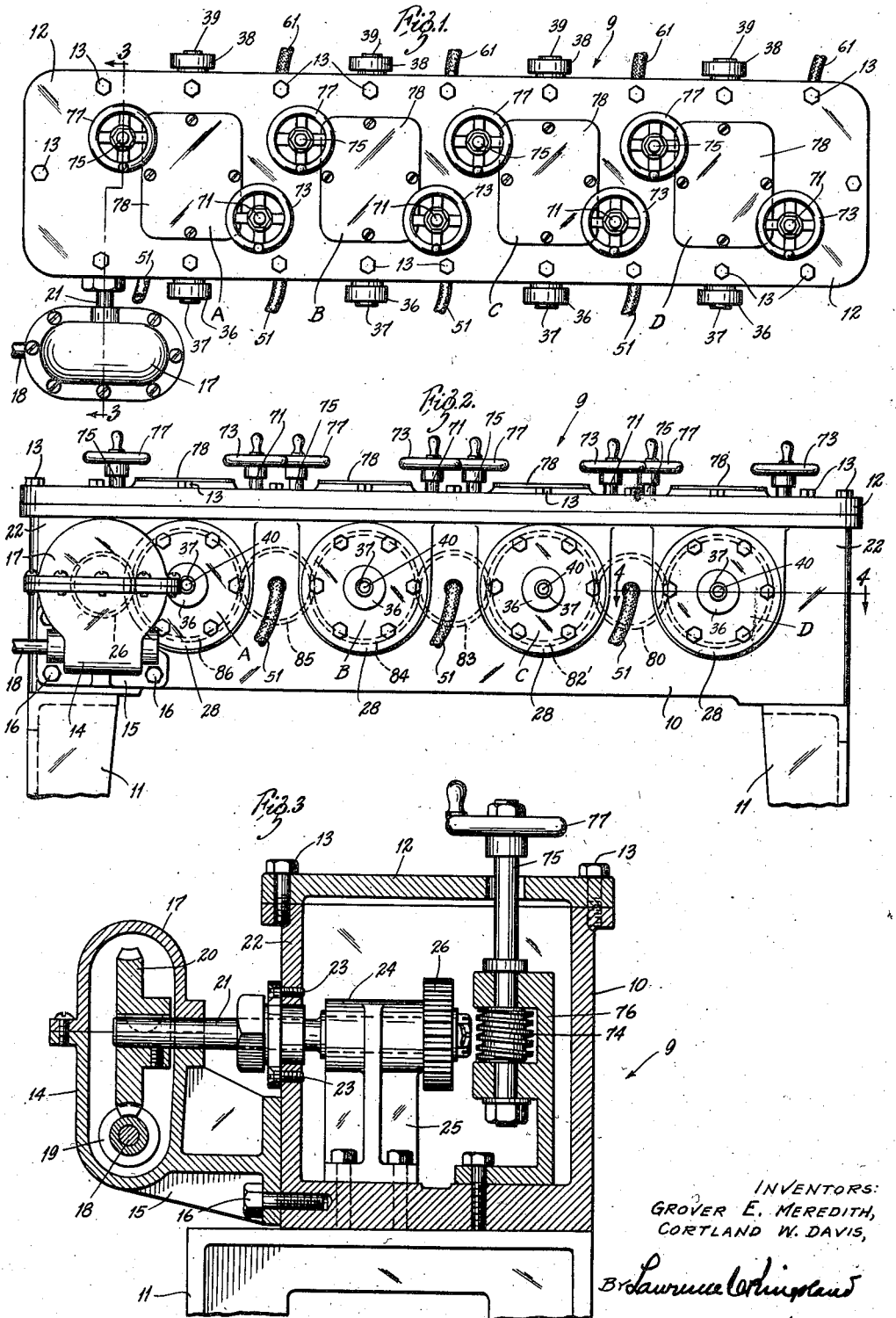

Patented Jan. 19, 1943

2,308,705

UNITED STATES PATENT OFFICE 2,308,705

TIMING MECHANISM

Grover E. Meredith, Jonesboro, and Cortland W. Davis, Summitville, Ind., assignors to The Mantle Lamp Company of America, Chicago, Ill., a corporation of Illinois Application September 7, 1940, Serial No. 355,776

6 Claims. (Cl. 251—107)

The present invention is directed to a mechanism for use in distribution, and particularly for the distribution of fluid, such as compressed air. One use of it is in connection with glass feeding mechanism where it times and distributes compressed air to the several mechanisms involved in the glass machinery.

An object of the invention is to provide a timing mechanism for operating a plurality of distribution lines, and to provide individual adjustments for each of the lines.

Another object of the invention is to provide, in a mechanism of this type, a plurality of valves individually adjustable during operation of the machine.

Another object is to provide a novel adjustable rotary valve.

Fundamentally, the mechanism includes a power shaft with individual take-off mechanism for each of a plurality of valves with a combination valve and adjusting mechanism in each valve.

In the drawings:

Fig. 1 is a plan view of a preferred embodiment of the device;

Fig. 2 is a front elevation thereof;

Fig. 3 is a vertical front to rear section on the line 3—3 of Fig. 1;

Fig. 4 is a horizontal section looking downwardly taken on the line 4—4 of Fig. 2; and Fig. 5 is a vertical section on the line 5—5 of Fig. 4.

The timing mechanism 9 includes a box or casing 10 supported on suitable legs 11 and having a top cover 12 removably attached as by screws 13 passing through the top and through a flange on the box member 10.

At one end and on the front of the box 10 is a housing 14 attached to or integral with a bracket 15 which is secured to the housing as by screws 16 (Fig. 3). The housing 14 has a cover 17.

Into the lower part of the housing 14 there extends a power shaft 18, suitably journaled (Fig. 3). On the shaft 18 and within the housing 14 there is fastened a worm 19 that meshes with a worm gear 20 secured to a countershaft 21 that extends from within the housing 14 into the box 10, passing through front wall 22 of the box member 10. A seal is obtained by means of a stuffing box 23. The inner end of the shaft 21 is journaled in a bearing 24 supported on a bracket 25 attached to the bottom of the box 10 by suitable screws, or the like. The shaft 21 has a gear 26 fixed to its inner end to rotate with it.

By the foregoing, rotative power is transmitted to the inside of the box 10. Within the box 10 is a series of rotary valves, all of which are operated from the shaft 21. A description of one of these valves will suffice.

To the front 22 of the box 10 is secured a series of circular plates 28, and opposite each of them to the rear wall of the box 10 are corresponding plates 29, each plate 28 and 29 being secured by suitable screws, or the like (Figs. 2 and 4). Each of the plates 28 has a central journal 30 and each of the plates 29 a central journal 31. The plates 28 also have threaded nipples 32 extending inwardly and forming part of the journals. Similar nipples 33 are formed on the inner surfaces of the plates 29.

The journals 30 and 31 receive a rotatable shaft 35. A suitable packing gland 36 is secured on the plate 28 adjacent the forward end 37 of the shaft. A corresponding packing gland 38 is secured on the rearward end 39 of the shaft 35.

The forward end 37 of the shaft 35 has a central bore 40 which terminates short of the middle thereof, the bore 40 extending into a tapered or conical portion 41 which merges with an enlarged middle portion 42. A counterbore 43 leads from the surface of the tapered portion into the bore 40.

Correspondingly, the rear end 39 of the shaft 35 has a central bore 44 into which extends a counterbore 45 passing through a tapered portion 46.

On the tapered portion 41 is a worm gear 47 whose central opening is tapered to correspond to the tapered surface of the portion 41 of the shaft 35. The gear 47 is provided with a radial bore 48 leading to a counterbore 49 which has a threaded outlet into which there is fitted a nipple 50. To the nipple 50 is attached one end of a flexible hose connection 51. A spring 52 surrounds the forward end 37 of the shaft 35 and is compressed between a collar 53 adjustably disposed on the threaded nipple 32 and a channel surface 54 on the hub of the gear 47. The spring 52, therefore, maintains the gear 47 tightly on the tapered portion 41.

Similarly, there is a worm gear 57 having a tapered bore engaging the tapered portion 46 of the rearward end 39 of the shaft 35. The gear 57 has a bore 58 adapted to register with the counterbore 45 in the tapered portion 46, and also has a counterbore 59 threaded at its outer end to receive a nipple 60 with its attached flexible hose 61. A spring 62 engages between an adjustable collar 63 on the nipple 33 and a channel surface 64 on the hub of the gear 57.

On the center enlarged portion 42 of the shaft 35 there is secured by a key or other suitable means a driving gear 67. The means for operating this gear will be described hereinafter.

The worm gears 47 and 57 are normally stationary, but means are provided for their adjustment (Figs. 3–5). To this end there meshes with the worm gear 47 a worm 70. The worm 70 is keyed to vertical shaft 71 which is supported in opposed vertical bearings forming part of a bracket 72 attached to the bottom of the box 10. The shaft 71 extends through the cover 12 and receives on the exteriorly disposed end a hand wheel 73 (Fig. 1). Rotation of the hand wheel 73 changes the angular position of the gear valve 47.

The gear 57 is operated by a similar worm 74 fixed to a vertical shaft 75 supported by a bracket 76 mounted on the bottom of the box 10. The shaft 75 extends through the cover 12 and has a hand wheel 77 at the top thereof.

Above the top of the gear 67 connected to the cover 12 is a removable plate 78 to give access to the mechanism.

The gear 67 is driven by a pinion 80 supported on a countershaft 81 supported in a bracket 82 attached to the bottom of the box 10. The pinion 80 correspondingly meshes with another driven gear 82' on the adjacent valve, corresponding to the gear 67 (Fig. 2). The gear 82' meshes with a succeeding corresponding small gear or pinion 83 which meshes with a corresponding driven gear 84. In mesh with the gear 84 is another small gear 85, which in turn is in mesh with a valve driving gear 86, the gear 86, meshing directly with the power gear 26.

It is clear, therefore, that power is taken off through the gear 26, and that all of the valve gears are simultaneously rotated therefrom.

The operation of the device is as follows:

The power shaft 18, through the medium of the worm 19, the worm gear 20, the countershaft 21 and the gear 26, rotates the several valves in unison. Once during each revolution of each valve shaft 35, the front valve on each shaft will be opened when the counterbore 43 coincides with the bore 48 on the valve worm gear 47. Likewise, the rear valve will open once during each such revolution when its counterbore 45 coincides with the bore 58 in the worm gear 57. During such intervals of coincidence, air connected for flow into the flexible hoses 51 and 61 will flow through the passages 48, 43 and 58, 45, respectively, and thence into the bores 49 and 44 from which it exhausts.

The several valves may be wholly independently adjusted, and these adjustments may be made during the operation of the mechanism. Rotation of the hand wheel 73 will adjust the front valve so that it will open at any desired point in the revolution of the shaft 35. The flexible hose 51 permits movement of the nipple 50 during this adjustment. At the same time, the spring 52 always holds the valve gear 47 against the tapered portion 41 of the shaft to maintain a tight bearing. The force of the spring 52 is adjustable by the nut 53.

In like manner, the rear valve may be adjusted by rotating the hand wheel 77.

It will be seen that there are provided in the specific illustration eight valves operating from a single power source through a single power unit. Since the constructions are double (Fig. 4), these eight valves require only four valve shafts 35. Any required number of valves may be incorporated as a single unit driven from the same power source.

The entire box 10 may be filled with oil to a level sufficient to lubricate the entire mechanism. The packing glands and suitable gaskets prevent leakage of the oil.

Thus, any plurality of operations desired may be performed in any order and with any desired timing arrangement. In the case of a glass machine, the timing device 9 may operate the feeder with valves A, the shears with valves B, and the forming machines with valves C and D.

It is to be understood that the foregoing description and accompanying drawings are merely illustrative of the present invention, the invention being limited only by the scope of the claims which follow.

What is claimed is:

1. A rotary valve comprising a support, a shaft journaled therein including a tapered portion, a bore in said shaft extending from one end into the tapered portion, a counterbore through said tapered portion tapping said bore, means engaging said tapered portion having a bore adapted to align with the counterbore in one position of rotation of the shaft, means constantly forcing said means into its engaging relationship with the tapered portion, means for maintaining said first means stationary, and means for rotating said shaft.

2. A rotary valve comprising a support, a shaft journaled therein including a tapered portion, a bore in said shaft extending from one end into the tapered portion, a counterbore through said tapered portion tapping said bore, means engaging said tapered portion having a bore adapted to align with the counterbore in one position of rotation of the shaft, means constantly forcing said means into its engaging relationship with the tapered portion, means for maintaining said first means stationary, means for rotating said shaft, and means for adjusting said first means during operation of the valve.

3. A valve mechanism comprising a rotatable member including a passageway extending into one end, a normally stationary member in contact with the rotatable member, the normally stationary member including a passage in engagement with the passageway in one position of rotation of the rotatable member, means communicating the passage with a device to be actuated, means for rotating said rotatable member, and means for individually adjusting the normally stationary member during operation of the valve.

4. A valve mechanism comprising a rotatable member including a passageway leading thereinto from one end, said member including a tapered portion, a normally stationary member in contact with said tapered portion of the rotatable member, said normally stationary member including a passage in engagement with the passageway in one position of rotation of the rotatable member, means communicating the passage with a device to be actuated, means for rotating said rotatable member, and means for adjusting the normally stationary member during operation of the valve.

5. A valve mechanism comprising a rotatable member including a passageway, said member including a tapered portion, a normally stationary member in contact with said tapered portion of the rotatable member, means constantly forcing said stationary member into its engaging relationship with said tapered portion, said normally stationary member including a passage in engagement with the passageway in one position of rotation of the rotatable member, means communicating the passage with a device to be actuated, means for rotating said rotatable member, and means for individually adjusting the normally stationary member during operation of the valve.

6. A valve mechanism comprising a support, a rotatable member supported thereby including a tapered portion and having a passageway extending from a free opening into said tapered portion and exhausting therefrom, a normally stationary member in contact with said tapered portion including a passage registering with said exhaust of the passageway in said rotatable member in one position of said rotatable member, means biasing said normally stationary member into contact with said rotatable member, means for rotating the rotatable member, said normally stationary member comprising a worm gear, a worm in engagement therewith, and means for rotating the worm and therethrough the worm gear member during operation of the valve mechanism to change the relative location of the passage.

GROVER E. MEREDITH.
CORTLAND W. DAVIS.